(12) United States Patent
Uematsu

(10) Patent No.: US 10,009,506 B2
(45) Date of Patent: Jun. 26, 2018

(54) IMAGE FORMING SYSTEM, IMAGE-DATA TRANSMISSION UNIT, AND IMAGE-DATA TRANSMISSION METHOD

(71) Applicant: Konica Minolta, Inc., Chiyoda-ku, Tokyo (JP)

(72) Inventor: Daisuke Uematsu, Hachioji (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days. days.

(21) Appl. No.: 15/619,098

(22) Filed: Jun. 9, 2017

(65) Prior Publication Data
US 2017/0359483 A1    Dec. 14, 2017

(30) Foreign Application Priority Data
Jun. 13, 2016 (JP) .................................. 2016-117325

(51) Int. Cl.
*H04N 1/32* (2006.01)
*H04N 1/64* (2006.01)

(52) U.S. Cl.
CPC ..... *H04N 1/32689* (2013.01); *H04N 1/32128* (2013.01); *H04N 1/32619* (2013.01); *H04N 1/648* (2013.01); *H04N 2201/3278* (2013.01); *H04N 2201/3284* (2013.01)

(58) Field of Classification Search
CPC ............... H04N 1/32689; H04N 1/648; H04N 1/32619; H04N 1/32128; H04N 2201/3278; H04N 2201/3284
USPC ........................................................ 358/1.14
See application file for complete search history.

(56) References Cited

U.S. PATENT DOCUMENTS

| 5,907,660 | A | * | 5/1999 | Inoue | ...................... | H04N 5/783 |
| | | | | | | 375/E7.273 |
| 6,477,277 | B1 | * | 11/2002 | Chippendale | ........... | G06T 9/005 |
| | | | | | | 358/426.01 |
| 6,707,563 | B1 | * | 3/2004 | Barry | ...................... | G06F 3/121 |
| | | | | | | 358/1.14 |

(Continued)

FOREIGN PATENT DOCUMENTS

JP       2887156 B2     4/1999
JP    2004-110091 A    4/2004

(Continued)

*Primary Examiner* — Allen H Nguyen
(74) *Attorney, Agent, or Firm* — Buchanan Ingersoll & Rooney PC

(57) ABSTRACT

An image forming system includes: an image-data transmission unit that transmits image data; and an image-data receiving unit that receives the image data, the image-data transmission unit being connected to the image-data receiving unit through a transmission path having lanes used for a color machine, at the time of image data transmission, the image-data transmission unit adding an error check code to image data, and transmitting the image data to the image-data receiving unit, in a first unit of the image data, the image-data receiving unit calculating an error check code in the first unit, comparing the calculated error check code with the error check code transmitted, and when the calculated error check code disagrees with the error check code transmitted, transmitting an error to the image-data transmission unit, and when the image-data transmission unit receives the error, the image-data transmission unit retransmitting image data corresponding to the error.

17 Claims, 6 Drawing Sheets

(56) References Cited

U.S. PATENT DOCUMENTS

2004/0257390 A1* 12/2004 Ito .................. H04N 1/32797
                                                                                         347/5
2012/0092694 A1* 4/2012 Tsubota ............ G06K 15/1821
                                                                                        358/1.14

FOREIGN PATENT DOCUMENTS

| JP | 2004110091 A | * | 4/2004 |
| JP | 2005-86726 A | | 3/2005 |
| JP | 2010-118946 A | | 5/2010 |

* cited by examiner

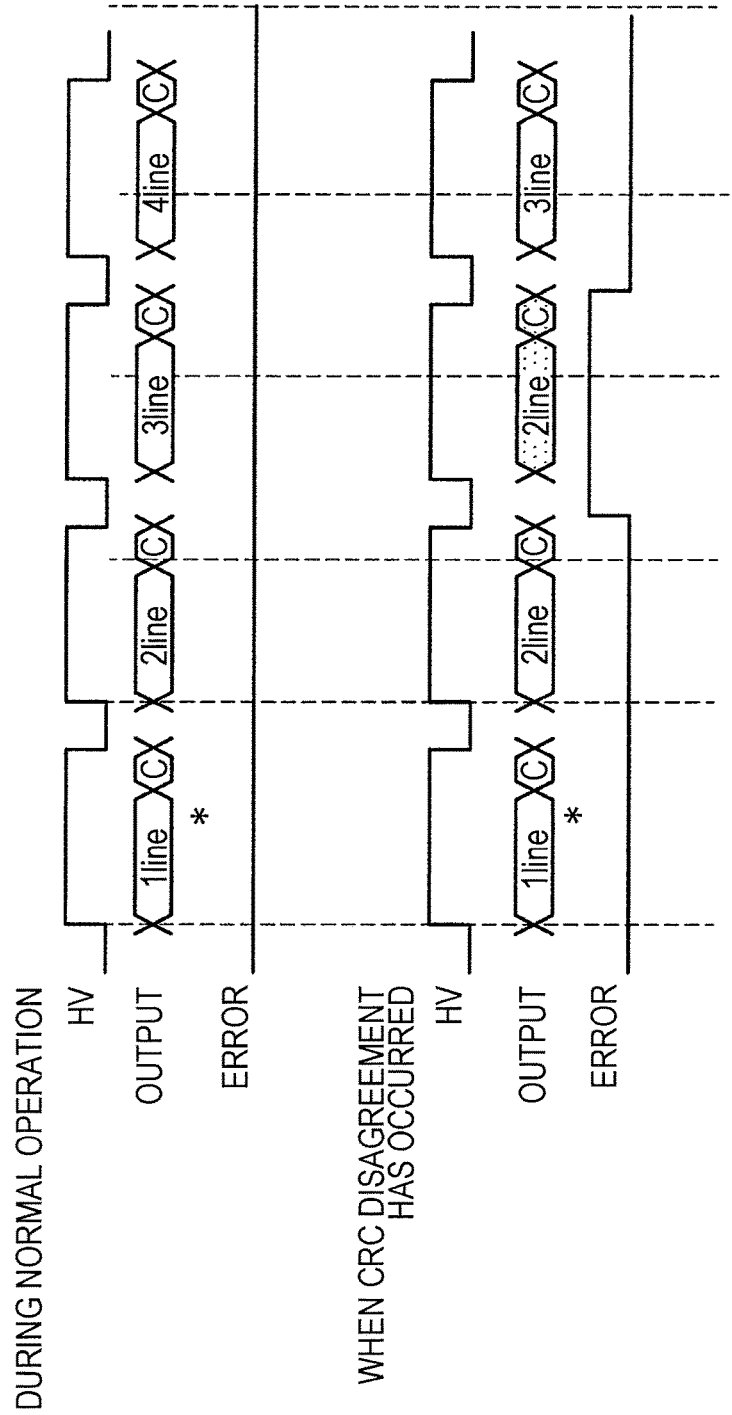

IMAGE FORMING SYSTEM, IMAGE-DATA TRANSMISSION UNIT, AND IMAGE-DATA TRANSMISSION METHOD

The entire disclosure of Japanese Patent Application No. 2016-117325 filed on Jun. 13, 2016 including description, claims, drawings, and abstract are incorporated herein by reference in its entirety.

BACKGROUND OF THE INVENTION

Field of the Invention

The present invention relates to an image forming system that transmits image data through a transmission path having a plurality of lanes for a color machine, and to an image-data transmission unit and an image-data transmission method.

Description of the Related Art

When image data is transmitted from an external controller to an image forming device, the image data is transmitted in synchronization with HV (Horizontal Valid: horizontal image valid region signal), VV (Vertical Valid: vertical image valid region signal), and Index. In the case of color image transmission, lanes for Y (yellow), M (magenta), C (cyan), K (black) and TAG (data attribute information) are prepared, and color image is transmitted through the lanes. The connection to the external controller requires a very long cable (for example, several meters), which causes signal degradation, and image data is easily influenced by exogenous noises, and therefore unexpected image data may be obtained.

Accordingly, there is conceived a method in which a line buffer and a code addition unit are provided inside an image input unit, an error detecting code (for example, CRC: Cyclic Redundancy Check) of an image write line of the image data is calculated, and the error detecting code is added to the end of the image write line.

On the receiving side, an image forming control unit is provided with a code interpretation unit for calculating and comparing a similar code, the code calculated by the code interpretation unit is compared with the CRC added to the end of the image write line, and when the code agrees with the CRC, the image write line data is used as it is, whereas when the code does not agree with the CRC, error notification is performed, thereby performing retransmission on an image write line basis.

The above configuration will be specifically described on the basis of FIGS. 7 and 8.

FIG. 7 illustrates a control block of a conventional image forming system 300, and includes a controller 100 and an image forming device 200.

The controller 100 includes an image input unit 110 that obtains image data from the outside or the like, and the image input unit 110 includes a line buffer 111 that stores image data of at least one line in a main scanning line direction.

The front and rear stage sides of the line buffer 111 are connected to the code addition unit 120. The output side of the code addition unit 120 is connected to a transmission path 250. The transmission path 250 is a color-system transmission path, and includes, as 8-bit lanes, a TAG lane 250T indicating image classification (classification such as text and image), a K lane 250K for black, a Y lane 250Y for yellow, an M lane 250M for magenta, and a C lane 250C for cyan. The transmission path 250 further includes an error lane 250ERROR as a 1-bit lane used for an error signal. Among the lanes, the TAG lane 250T, the K lane 250K, the Y lane 250Y, the M lane 250M and the C lane 250C are selectably connected to the code addition unit 120. The error lane 250ERROR used for error communication is connected to the image input unit 110.

In the image forming device 200, each lane of the transmission path 250 is connected to the image input unit 210. The image input unit 210 includes a line buffer 211 that stores image data of at least one line in a main scanning line direction. In addition, the transmission path 250 is connected to the code interpretation unit 221 of the image forming control unit 220 provided in the image forming device 200. The image forming control unit 220 is connected to the error lane 250ERROR of the transmission path 250, and transmits an error signal to the image input unit 110 of the controller 100 through the error lane 250ERROR.

The image data output side of the image input unit 210 is connected to an image forming unit 230, and an image is printed to a transfer medium.

Transmission of image data in the above-described image forming system 300 will be described.

Image data is inputted into the image input unit 110, and the image data corresponding to at least one line in the main scanning line direction is stored in the line buffer 111, and is transmitted to the code addition unit 120. The code addition unit 120 calculates an error check code on the basis of the image data corresponding to one line in the main scanning line direction by, for example, CRC or the like, and adds the calculated error check code to the end of the line of the image data. The code addition unit 120 transmits the image data to the image forming device 200 through the transmission path 250.

In the image forming device 200, the image input unit 210 stores image data of at least one line in the main scanning line direction in the line buffer 211, an error check code is calculated in the same method as that used when the error check code is calculated for the image data corresponding to one line on the controller 100 side, and the result of the calculation is then compared with the error check code added to the line to evaluate the validity of the transmitted image data. When both of the error check codes agree with each other, the image input unit 210 determines that no error has occurred, and transmits the image data in the line buffer 211 to the image forming unit 230 to print the image to a transfer medium.

When both of the error check codes do not agree with each other, the image input unit 210 determines that an error has occurred. Therefore, the image forming control unit 220 transmits an error signal to the image input unit 110 of the controller 100 through the error lane 250ERROR. On receipt of the error signal, the image input unit 110 retransmits image data corresponding to one line in the main scanning line direction, which is stored in the line buffer 111, to the code addition unit 120. The code addition unit 120 calculates an error check code in the same manner as the calculation made before the retransmission, adds the error check code to the image data, and then transmits the image data to the image forming device 200 through the transmission path 250. The image forming device 200 also evaluates the validity of the retransmitted image data.

FIG. 8 is a time chart illustrating an image-data transmission state.

During the normal operation, an HV synchronization signal, and image data corresponding to one line, to which a CRC error check code is added, are transmitted from the controller 100.

In the image forming device 200, the validity of the received image data is evaluated, and a comparison is made between the transmitted error check code and the error check code calculated by image forming device 200. When the error check codes do not agree with each other, an error signal is transmitted to the controller 100.

When a CRC disagreement has occurred, image data corresponding to an error is retransmitted in the timing in which the image data can be retransmitted. In this example, immediately after image data of the second line has been transmitted, an error signal is returned from the image forming device 200 to the controller 100. The controller 100 transmits the image data of the second line, and subsequently transmits the image data of the third line.

The above description relates to a case where a color image signal is transmitted. However, when monochrome image data is transmitted, the image data is transmitted by using the TAG lane 250T and the K lane 250K. In this case, in a manner similar to the above, an error check code is calculated, and the error check code is then added to the image data on the controller 100 side, and the validity of the image data is evaluated on the basis of the error check code on the image forming device 200 side.

When a color machine and a monochrome machine are connected to the external controller by using a common interface, only K and TAG are used. In general, monochrome machines are characterized by being faster in printing speed than color machines. Therefore, the time taken after a page has been completely fed until the next page feeding is started is very short.

Therefore, it is considered that when errors frequently occur in image data transmission, there is a possibility that retransmission on an image write line basis will cause a delay. There can also be considered a method in which a frequency is made higher, or a method in which a bus width of input is made wider to shorten HV, VV and Index. However, the former method is not desirable from the viewpoint of the transmission quality and the power consumption, and the latter method is not desirable from the viewpoint of the consistency with image input in a color machine.

JP 2010-118946 A proposes a method in which when line image data in which a symbol is added to each of the front end and rear end of an image write line is invalid, the invalid line image data is complemented from image data before and after the invalid line image data. In this method, even in a case where an error has occurred, the image data can be complemented without requiring retransmission of the image data.

In addition, JP 2004-110091 A discloses the feature wherein when monochrome image data is transmitted, the monochrome image data is divided into a plurality of pieces of monochrome image data, which are then transmitted through a plurality of color lanes respectively, and the image data before the division is reconstructed by the transmitted divided pieces of image data, thereby increasing transmission speed.

However, in the method of JP2010-118946 A, although the performance does not decrease, the complement is nothing but estimation. Therefore, there exists a problem that when image data is complemented, it is not possible to suppress the deterioration of the image quality.

In addition, in JP2004-110091 A, error detecting codes are not taken into consideration. Moreover, there exists a problem that the division and reconstruction of data are required, which leads to an increase in processing load.

SUMMARY OF THE INVENTION

The present invention has been made taking the above-described circumstances as the background into consideration, and an object of the present invention is to provide an image forming system that is capable of transmitting data at high speed even in the case of monochrome image data transmission, and that is capable of, even in a case where an error check code is used, when image data is retransmitted, efficiently performing the transmission without causing overhead to increase, and to provide an image-data transmission unit and an image-data transmission method.

To achieve the abovementioned object, according to an aspect, an image forming system reflecting one aspect of the present invention comprises: an image-data transmission unit that transmits image data; and an image-data receiving unit that receives the image data, the image-data transmission unit being connected to the image-data receiving unit through a transmission path having a plurality of lanes used for a color machine, at the time of image data transmission, the image-data transmission unit adding an error check code to image data, and transmitting the image data to the image-data receiving unit, in a first unit of the image data, the image-data receiving unit calculating an error check code in the first unit on the basis of the transmitted image data, comparing the calculated error check code with the error check code transmitted from the image-data transmission unit, and when the calculated error check code does not agree with the error check code transmitted from the image-data transmission unit, transmitting an error to the image-data transmission unit, and when the image-data transmission unit receives the error, the image-data transmission unit retransmitting image data corresponding to the error, wherein the image-data transmission unit is capable of calculating an error check code of image data, and transmitting the calculated error check code to the image-data receiving unit, in a second unit that is smaller than the first unit, the image-data receiving unit compares the error check code calculated on the basis of the transmitted image data with the error check code transmitted from the image-data transmission unit in the second unit, and when the error check code calculated on the basis of the transmitted image data does not agree with the error check code transmitted from the image-data transmission unit, the image-data receiving unit is capable of transmitting an error to the image-data transmission unit, and when the image-data transmission unit transmits monochrome image data, the image-data transmission unit transmits the error check code in the second unit, and transmits the monochrome image data and at least the error check code in the second unit in parallel by using respective different color machine lanes of the transmission path.

According to the image forming system of another aspect, the first unit is preferably image data based on an image write line unit, and the second unit is preferably a pixel unit or a packet unit.

According to the image forming system of another aspect, the image-data transmission unit is preferably a print controller, and the image-data receiving unit is preferably an image forming device.

According to the image forming system of another aspect, the image-data transmission unit preferably comprises a transmission-side image input unit having a buffer that is capable of storing image data for retransmission, a first code addition unit that calculates an error check code of the image data, and adds the error check code to the image data, in the first unit, and a second code addition unit that calculates an error check code of the image data, and adds the error check code to the image data, in the second unit, and the image-data receiving unit preferably comprises a receiving-side image input unit having a buffer that is capable of storing image data for error check, a first code interpretation unit that calculates an error check code in the first unit, and compares the calculated error check code with the error check code based on the first unit added to the image data, and a second code interpretation unit that calculates an error check code in the second unit, and compares the calculated error check code with the error check code based on the second unit added to the image data.

According to the image forming system of another aspect, the image-data transmission unit preferably transmits retransmission data through lanes that differ from lanes for transmitting the image data.

According to the image forming system of another aspect, the image-data transmission unit and the image-data receiving unit each preferably calculate and compare error check codes doubly both in the first unit and in the second unit.

According to the image forming system of another aspect, the error check code based on the first unit is preferably transmitted through lanes for transmitting image data.

According to the image forming system of another aspect, the image-data receiving unit and the image-data transmission unit preferably grasp, by training, a correspondence relationship between an error signal notified from the image-data receiving unit and the timing of a retransmitted pixel.

According to the image forming system of another aspect, when the image-data transmission unit transmits retransmission image data in the second unit, the image-data transmission unit preferably transmits the retransmission image data, in parallel with image data and error check codes, through lanes that differ from lanes for transmitting the image data and differ from lanes for transmitting the error check codes.

According to the image forming system of another aspect, the image-data transmission unit preferably switches between a monochrome machine system and a color machine system by the same circuit.

According to the image forming system of another aspect, the image-data transmission unit is preferably capable of selecting the lanes of the transmission path between a monochrome system and a color system according to a speed of a monochrome machine that receives image data.

According to the image forming system of another aspect, the image-data transmission unit preferably selects the lanes of the transmission path between a monochrome system and a color system according to a speed of a monochrome machine that receives image data, and when the speed of the monochrome machine is sufficient, transmission is preferably performed by the monochrome system, and a function of adding the error check code in the second unit, and a function of comparing the error check codes in the second unit by the image-data receiving unit are stopped.

According to the image forming system of another aspect, when there is a possibility that the retransmission of the image data does not satisfy performance in the monochrome machine, the image-data transmission unit and the image-data receiving unit preferably enable the functions in the middle, and switch the transmission of the image data and the error check code in the second unit to real-time transmission to perform the transmission.

According to the image forming system of another aspect, when the image-data transmission unit not only transmits image data in the same unit but also transmits the image data in a different unit, the image-data transmission unit is preferably capable of retransmitting the image data and the error check code for retransmission.

To achieve the abovementioned object, according to an aspect, an image-data transmission unit reflecting one aspect of the present invention is connected to an image-data receiving unit through a transmission path having an a plurality of lanes for a color machine, adds an error check code to image data, and transmits the image data to the image-data receiving unit, in a first unit, and when an error is received from the image-data receiving unit, retransmits image data corresponding to the error to the image-data receiving unit, wherein the image-data transmission unit is further capable of calculating an error check code, and transmitting the calculated error check code to the image-data receiving unit, in a second unit that is smaller than the first unit, and when an error is received from the receiving side, retransmitting image data corresponding to the error, and when the image-data transmission unit transmits a monochrome image, the image-data transmission unit transmits an error check code in the second unit, and transmits the monochrome image data and at least the error check code in the second unit in parallel by using respective different color machine lanes of the transmission path.

To achieve the abovementioned object, according to an aspect, there is provided an image-data transmission method in which an error check code is added to image data, and the image data is transmitted through a transmission path having a plurality of lanes used for a color machine, in a first unit, and when an error is received from a receiving side, image data corresponding to the error is retransmitted, and the method reflecting one aspect of the present invention comprises the steps of:

calculating an error check code, and transmitting the calculated error check code to the receiving side, in a second unit that is smaller than the first unit, and when an error is received from the receiving side, retransmitting image data corresponding to the error; and when monochrome image data is transmitted, transmitting the error check code in the second unit, and transmitting the monochrome image data and at least the error check code in the second unit in parallel by using respective different color machine lanes of the transmission path.

To achieve the abovementioned object, according to an aspect, there is provided an image-data transmission method in which an error check code is added to image data, and the image data is transmitted through a transmission path having a plurality of lanes used for a color machine, in a first unit, then on a receiving side, an error check code is calculated on the basis of the transmitted image data, the calculated error check code is compared with the transmitted error check code, and when the error check codes do not agree with each other, an error is transmitted to a transmission side, and on the transmission side, when the error is received, image data corresponding to the error is retransmitted, and the method reflecting one aspect of the present invention comprises the steps of:

calculating an error check code in a second unit that is smaller than the first unit, and transmitting the calculated error check code to the receiving side;

on the receiving side, comparing the error check code calculated on the basis of the transmitted image data with the transmitted error check code in a second unit, and when the error check codes do not agree with each other, transmitting an error to the transmission side; and when monochrome image data is transmitted, transmitting the error check code in the second unit, and transmitting the monochrome image data and at least the error check code in the second unit in parallel by using respective different color machine lanes of the transmission path.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 8 is a time chart illustrating a transmission state in the conventional image forming system.

DESCRIPTION OF THE PREFERRED EMBODIMENTS

Hereinafter, an embodiment of the present invention will be described with reference to the drawings. However, the scope of the invention is not limited to the illustrated examples.

Figure 1:
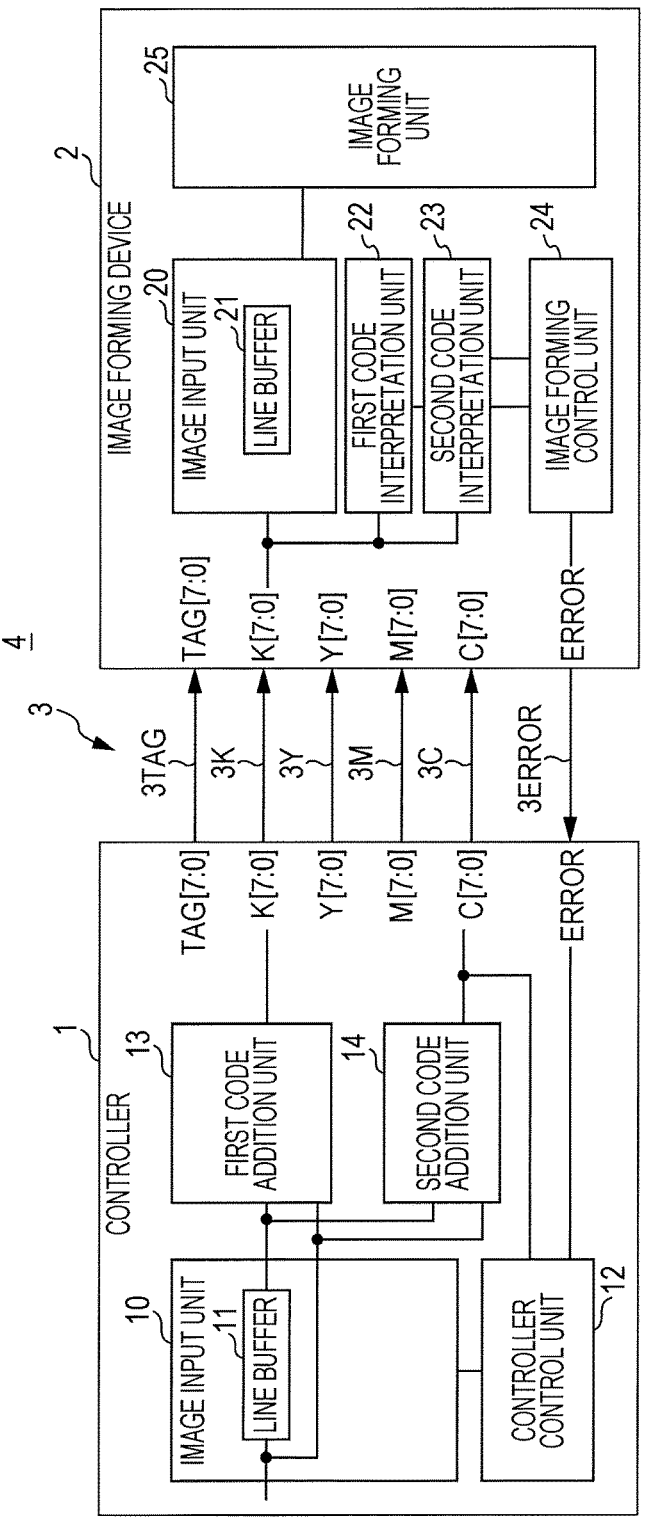
FIG. 1 is a diagram illustrating a control block of an image forming system according to one embodiment of the present invention.

FIG. 1 illustrates a control block of an image forming system 4 in which a controller 1 is connected to an image forming device 2 through a transmission path 3.

The controller 1 corresponds to the print controller and the image-data transmission unit in the present invention. It should be noted that the image-data transmission unit is not limited to the print controller, but may be a management server that manages the image forming device.

The image forming device 2 corresponds to the image-data receiving unit in the present invention. The image-data receiving unit is not limited to the image forming device, but may be a repeater that is not provided with an image forming unit.

The controller 1 includes an image input unit 10 that obtains image data from the outside or the like, and the image input unit 10 includes a linebuffer 11 that stores image data corresponding to at least one line in the main scanning line direction. It should be noted that a source of the image data is not particularly limited, and thus the image data may be obtained through a network, a serial cable or the like. In addition, image data may be generated by reading an original document by a scanner or the like in the image-data transmission unit.

A controller control unit 12 is controllably connected to the image input unit 10. The controller control unit 12 can be configured by, for example, a CPU, a program executed on the CPU, and a storage unit that stores the program, operation parameters and the like.

The image input unit 10 corresponds to the transmission-side image input unit.

A first code addition unit 13 and a second code addition unit 14 are connected to each of the front and rear stage sides of the line buffer 11. The first code addition unit 13 and the second code addition unit 14 can be configured by a CPU, a program executed on the CPU, and the like.

The output side of the first code addition unit 13, the output side of the second code addition unit 14, and the output side of the controller control unit 12 are connected to the color-system transmission path 3. The controller control unit 12 is capable of switching lanes through which the first code addition unit 13 and the second code addition unit 14 are connected to the transmission path 3.

It should be noted that although the first code addition unit 13 and the second code addition unit 14 are explained as another control block that is separated from the controller control unit 12 in this embodiment, the first code addition unit 13 and the second code addition unit 14 may be configured to be included in the controller control unit 12.

The transmission path 3 is a color-system transmission path, and includes, as 7-bit lanes, a TAG lane 3TAG indicating attribute information (classification such as text and image), a K lane 3K for black, a Y lane 3Y for yellow, an M lane 3M for magenta, and a C lane 3C for cyan. The transmission path 3 further includes an error lane 3ERROR as a 1-bit lane used for an error signal. The TAG lane 3TAG, the K lane 3K, the Y lane 3Y, the M lane 3M and the C lane 3C are selectably connected to the first code addition unit 13 and the second code addition unit 14. The error lane 3ERROR used for error communication is connected to the controller control unit 12.

In the image forming device 2, each lane of the transmission path 3 is connected to the image input unit 20. The image input unit 20 includes a line buffer 21 that stores image data of at least one line in the main scanning line direction. The image input unit 20 corresponds to the receiving-side image input unit.

The transmission path 3 is connected to the first code interpretation unit 22 and the second code interpretation unit 23 which are provided in the image forming device 2. The first code interpretation unit 22 and the second code interpretation unit 23 can be configured by a CPU, a program executed on the CPU, and the like.

The first code interpretation unit 22 and the second code interpretation unit 23 are connected to the image forming control unit 24. The image forming control unit 24 can be configured by, for example, a CPU, a program executed on the CPU, and a storage unit that stores the program, operation parameters and the like.

It should be noted that although the first code interpretation unit 22 and the second code interpretation unit 23 are explained as another control block that is separated from the image forming control unit 24 in this embodiment, the first code interpretation unit 22 and the second code interpretation unit 23 may be configured to be included in the image forming control unit 24.

The image-data output side of the image input unit 20 is connected to the image forming unit 25, and an image can be printed to a transfer medium.

In addition, the image forming control unit 24 is connected to the error lane 3ERROR of the transmission path 3, and is capable of transmitting an error signal to the controller control unit 12 of the controller 1 through the error lane 3ERROR.

Next, transmission of monochrome image data performed in the above-described image forming system 4 will be described.

Image data is inputted into the image input unit 10, and the image data corresponding to at least one line in the main scanning line direction is stored in the line buffer 11, and is transmitted to the first code addition unit 13 and the second code addition unit 14.

The first code addition unit 13 calculates an error check code on the basis of the image data corresponding to one line in the main scanning line direction by, for example, CRC or the like, and adds the calculated error check code to the end of the line of the image data. The first code addition unit 13 transmits image data to the image forming device 2 through the K lane 3K and the TAG lane 3TAG of the transmission path 3.

The second code addition unit 14 calculates an error check code by CRC or the like on a pixel basis, or on a packet basis, which is a unit relatively smaller than one line. The error check code is transmitted by using a lane that differs from lanes for transmitting image data. As the result, the error check code is transmitted on a short unit basis, which enables to suppress a decrease in transmission efficiency caused by an increase in overhead. The unit of calculation by the second code addition unit 14 is set by the controller control unit 12 beforehand, is stored in a nonvolatile memory or the like, and is read as necessary for the use of the control. It should be noted that the unit used by the second code addition unit 14 may be configured to be changeable by a user, or may be configured to be automatically set on the basis of the performance of the image forming device 2.

Incidentally, in the above-described embodiment, one line is used as a large unit, and a pixel or a packet is used as a small unit. However, both of the units are not in particular limited to the above, and units that have a relatively large and small relationship therebetween may be used. For example, a page unit or a unit constituted of a plurality of lines may be used as a large unit, and a unit constituted of a smaller number of lines maybe used as a short unit. In addition, a method for calculating an error check code on a large unit basis may differ from a method for calculating an error check code on a small unit basis.

Incidentally, this embodiment is described on the assumption that the error check code of the image data is calculated both on a line basis and in a unit smaller than the line unit. However, the error check code may be calculated only in a relatively small unit without calculating an error check code in a unit used for color transmission or the like. In this case as well, overhead can be suppressed by transmitting the calculation result of the error check code through a lane different from those used for the image data.

In the image forming device 2, the image input unit 20 stores image data corresponding to at least one line in the main scanning line direction in the line buffer 21, the first code interpretation unit 22 calculates an error check code in the same method as that used when the error check code is calculated for the image data corresponding to one line on the controller 1 side, and the result of the calculation is then compared with the error check code added to the line to evaluate the validity of the transmitted image data. The large unit used in the controller 1 and the large unit used in the image forming device 2 are configured to be the same.

In addition, in order to make a comparison with an error check code that is based on a pixel unit or a packet unit, and is transmitted through another lane, the second code interpretation unit 23 calculates an error check code in the same method as that used when the error check code is calculated on the controller 1 side. The calculation result is compared with the error check code that has been transmitted from the controller 1 through the lane different from those used for the image data, thereby evaluating the validity of the transmitted image data. It should be noted that the small unit used in the controller 1 and the small unit used in the image forming device 2 are configured to be the same.

When both of the error check codes agree with each other for each of the large unit and the small unit, it is determined that no error has occurred, and the image data in the line buffer 21 is transmitted to the image forming unit 25 to print the image to a transfer medium.

As the result of the determination in the large unit or the small unit, when both of the error check codes do not agree with each other, it is determined that an error has occurred. Therefore, the image forming control unit 24 transmits an error signal to the controller control unit 12 of the controller 1 through the error lane 3ERROR. On receipt of the error signal, the controller control unit 12 retransmits image data stored in the linebuffer 11 to the first code addition unit 13 and the second code addition unit 14. The first code addition unit 13 and the second code addition unit 14 calculate error check codes respectively in the same manner as the calculations made before the retransmission. The image data is transmitted through lanes of the transmission path 3, and the error check codes are transmitted to the image forming device 2 through a lane different from those used for the image data. The image forming device 2 also evaluates the validity of the retransmitted image data in like manner.

It should be noted that the unit of image data to be retransmitted can be changed depending on whether the error has occurred in image data based on the large unit or image data based on the small unit. In this example, when it is determined that an error has occurred at the time of transmitting image data corresponding to one line, the image data corresponding to one line is transmitted. In addition, when an error has occurred in a pixel unit or in a packet unit, image data may be transmitted in that unit, or may be transmitted in a line unit that is larger than the pixel unit or the packet unit.

Moreover, the present invention also allows the error check codes at the time of the retransmission to be transmitted together with the image data through the same lanes. However, it is preferable that the error check codes be transmitted through a lane different from lanes used for the image data so as to prevent the transmission efficiency from decreasing.

With respect to the above-described retransmission, when the occurrence of an error can be determined by using the small unit, determining an error in a short period of time enables the transmission even in such a situation in which using the large unit may cause a delay in retransmission.

Figure 2:
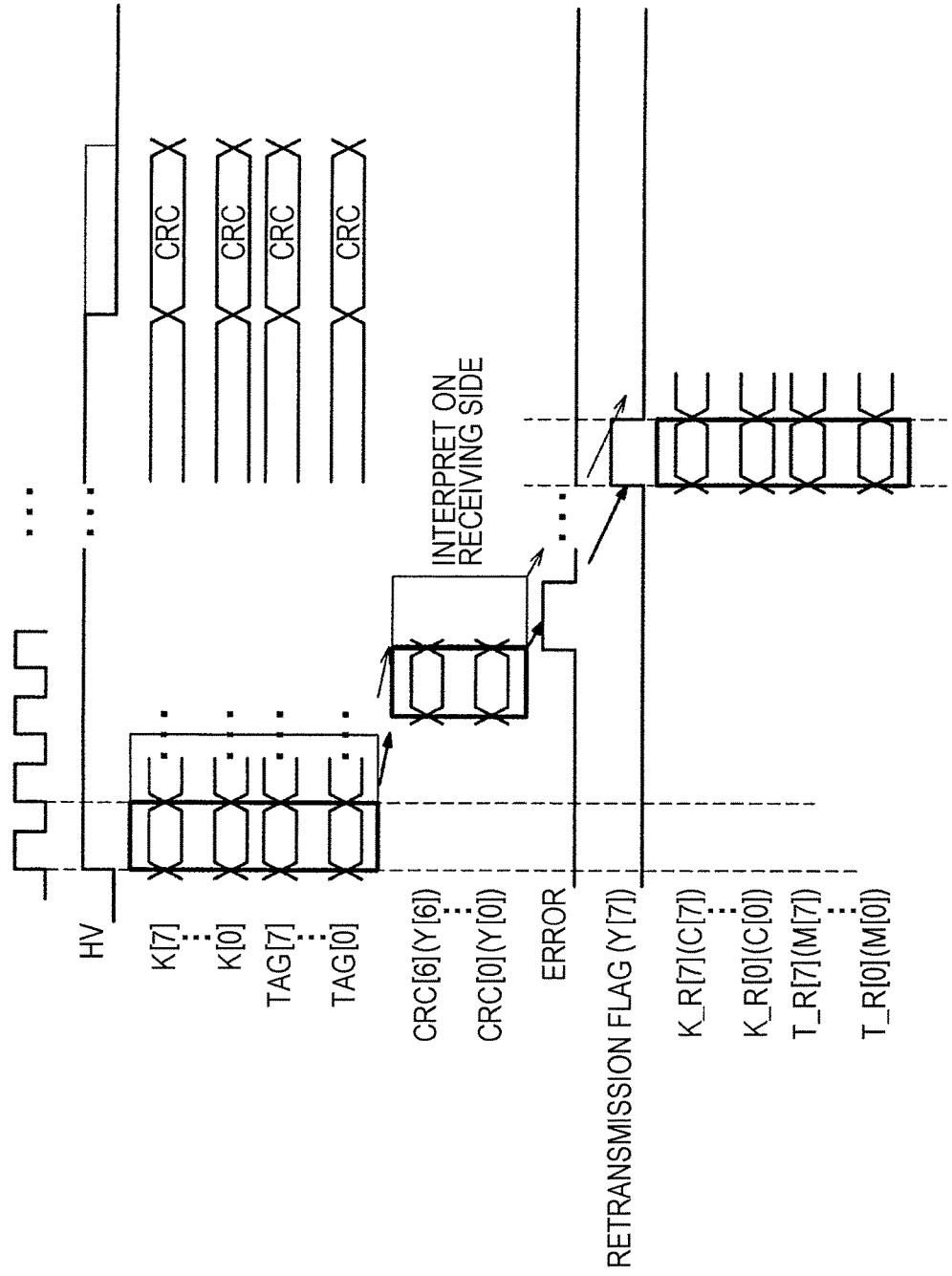
FIG. 2 is a time chart illustrating a transmission state of the image forming system according to one embodiment of the present invention.

Next, a state in which image data is transmitted to a monochrome image forming device will be specifically described by using a time chart of FIG. 2.

When image data is transmitted, a synchronization signal is transmitted in synchronization with the transmission of the image data.

In this case, by using the K lane 3K and the TAG lane 3TAG among the C, M, Y, K and TAG lanes, image data corresponding to one line and error check codes (CRC in the chart) corresponding to one line are transmitted on a pixel basis through the K lane 3K in synchronization with HV, VV and Index as usual, and the attribute information and the error check code in the image data are transmitted through the TAG lane 3TAG.

Moreover, concurrently with the above, TAG is combined to calculate an error check code based on CRC on a pixel basis. Here, a 7-bit CRC is used, and the result of CRC calculation is embedded in Y [6:0] by switching the same circuit to use the Y lane 3Y that is not used.

In the image forming device 2 on the receiving side, the first code interpretation unit 22 calculates an error check code for image data corresponding to one line, and the error check code is compared with the error check code added to the image data to evaluate the validity of the data. In addition, the second code interpretation unit 23 calculates an error check code for image data based on a pixel unit by CRC, and the calculated error check code is compared with the CRC error check code that has been transmitted by using Y [6:0], thereby evaluating the validity of the image data. The evaluation result is transmitted to the image forming control unit 24.

When a disagreement is found in image data corresponding to one line or image data based on a pixel unit, an error signal is generated, and is then transmitted through the error lane 3ERROR to notify the controller 1 of the abnormality of the image data corresponding to one line or the abnormality of the pixel.

The controller 1 on the transmission side, which has received the ERROR notification, retransmits the data corresponding to one line or the data of the pixel from the line buffer 11. In this case, the controller control unit 12 switches the same circuit to assign unused C [7:0]/M [7:0] to retransmission lanes of K [7:0]/TAG [7:0], thereby retransmitting the image data through the C lane 3C and the Y lane 3Y that constitute another path different from that used for usual image transmission. A retransmission flag indicating that data is being retransmitted through the retransmission lanes can be given to the image forming device 2 by using, for example, an unused bit of Ych, which is Y [7], through the Y lane 3Y.

Processing of the Image Forming Device 2 on the Receiving Side

Figure 3:
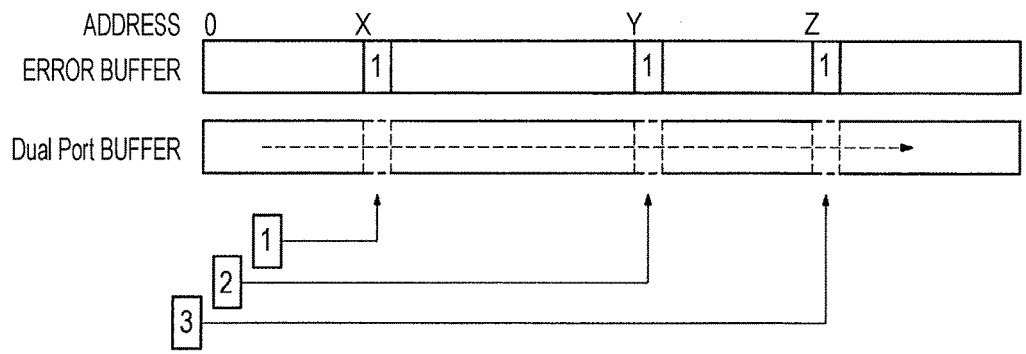
FIG. 3 is a diagram illustrating an example of processing of a line buffer on the receiving side in the image forming system according to one embodiment of the present invention.

As shown in FIG. 3, in the image forming device 2, a 1-bit line buffer is newly prepared separately from the image line buffer provided on the receiving side, and a flag is set on a pixel in which a CRC disagreement has been found. Pixels that have been retransmitted are embedded in order in the pixels on which flags are set respectively.

If a dual port buffer is used, while image data is written, retransmission data can be written to the same buffer. Instead of newly preparing a line buffer, an unused buffer, for example, the Ych lane, may be used.

Processing of the Controller 1 on the Transmission Side

On the controller 1 side, after CRC interpretation until an ERROR signal arrives, a delay of several clocks occurs under the influence of a device delay, a pattern delay, a cable delay and the like, and therefore the timing of ERROR does not always coincide with the corresponding pixel in the controller control unit 12 and in the image input unit 10. Accordingly, the controller 1 may be so configured that data is exchanged between the transmission side and the receiving side by training at the time of initial connection so as to grasp the delay amount beforehand, thereby determining a specific pixel corresponding to an ERROR signal.

In addition, in this embodiment, a method in which a CRC is added on a pixel basis is conceived of. However, by calculating an error check code not only on a pixel basis but also in a unit of a plurality of pixels (packets), it is possible to add, for example, bit extension, a retransmission packet number, the calculation of an error check code of a retransmission packet. For example, on the assumption that a CRC is calculated every three pixels of K, T to add the CRC, information that amounts to 3×8=24 bits can be handled. This enables to employ, for example, a 16-bit CRC, and consequently the reliability can be increased.

Figure 4:
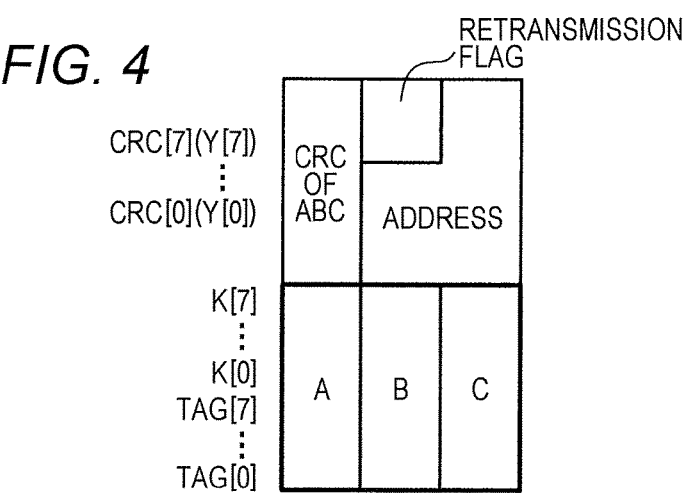
FIG. 4 is a diagram illustrating an example of how to use an error check code when data is transmitted on a 3-pixel basis in the image forming system according to one embodiment of the present invention.

Moreover, as another using method, as an alternative to the method in which retransmitted data is embedded in order of receiving the retransmitted data as shown in FIG. 4, a method in which 15-bit address information is embedded together with an 8-bit CRC and a 1-bit retransmission flag, and a specific pixel/packet in the line buffer, which is being retransmitted, is directly indicated by an address may be employed. The receiving side is capable of writing retransmitted data to a part corresponding thereto according to the address information of the received data.

Figure 5:
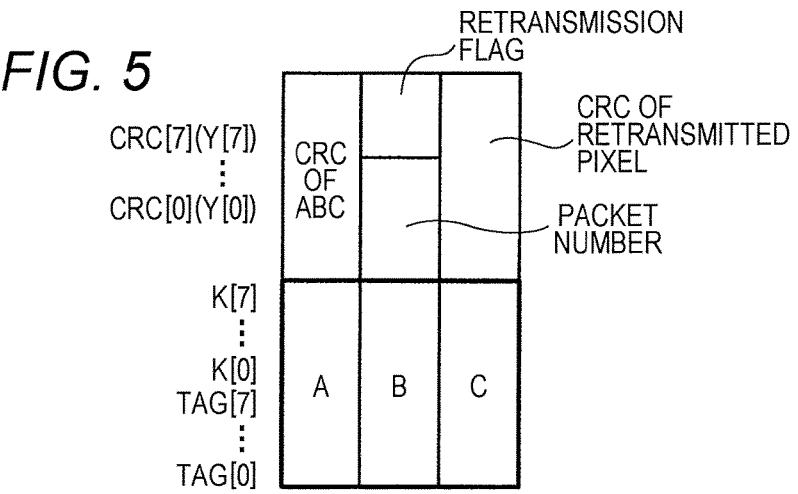
FIG. 5 is a diagram illustrating another example of how to use an error check code when data is transmitted on a 3-pixel basis in the image forming system according to one embodiment of the present invention.

Furthermore, as shown in FIG. 5, an 8-bit CRC of the K/TAG lane, a 1-bit retransmission flag, a 7-bit packet number indicating what number a retransmitted packet is, and an 8-bit CRC for retransmitted data of the Y/M lane may be included. When an error has occurred in a CRC of retransmitted data, the error may be notified by a command, and the data may be retransmitted together with a packet number after the next line or page.

In general, with respect to codes such as a CRC, a false detection rate decreases with the increase in the number of bits of a code to be output, and therefore the reliability is high. Although the CRC that outputs a 7-bit or 8-bit code is used as an example this time, there is also a method in which, for example, a large packet size is used to increase the number of bits of a CRC, thereby increasing the reliability.

Figure 6:
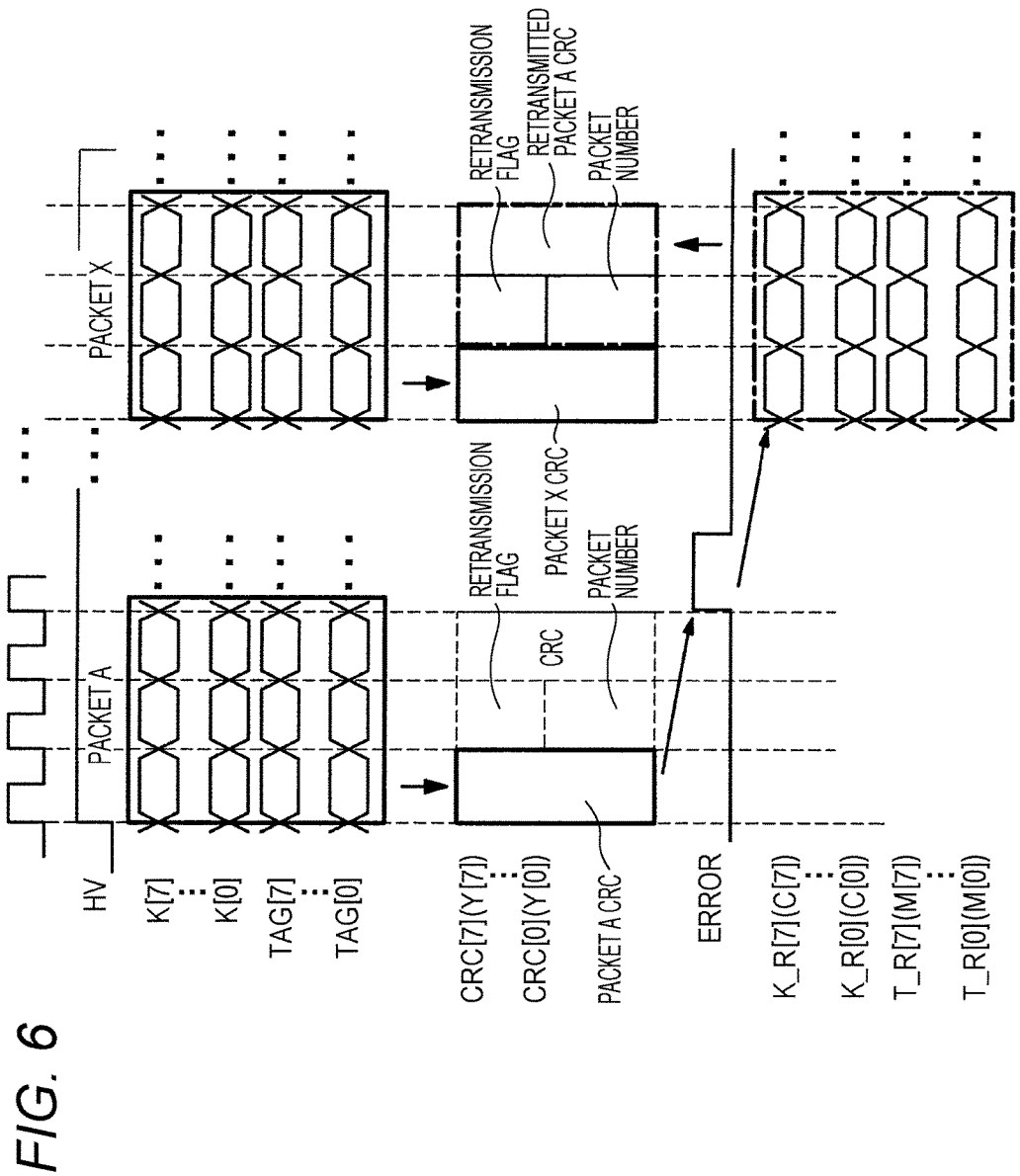
FIG. 6 is a time chart illustrating a transmission state when data is transmitted on a packet basis in the image forming system according to one embodiment of the present invention.
Figure 7:
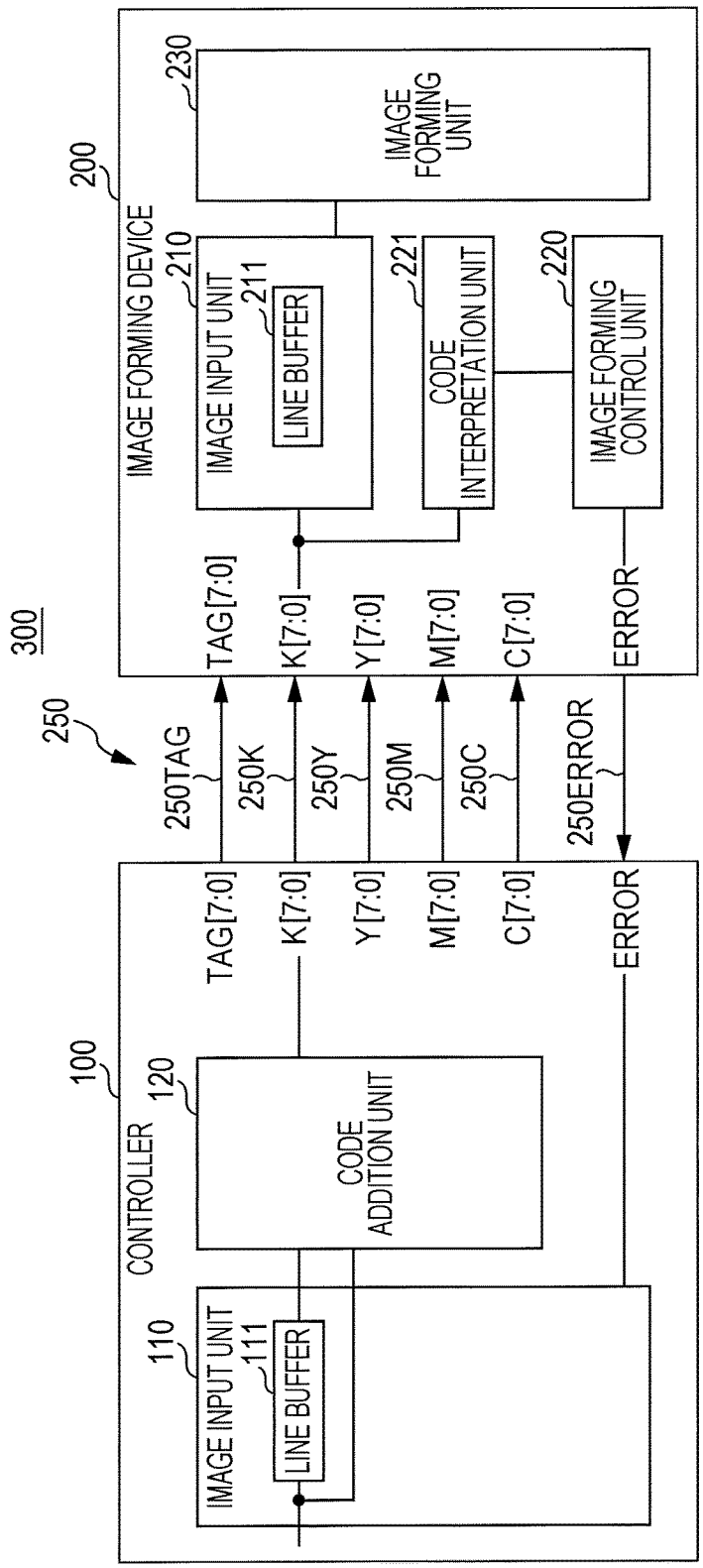
FIG. 7 is a diagram illustrating a control block in a conventional image forming system.

FIG. 6 is a time chart illustrating a state in which image data is transmitted on a packet basis.

When image data is transmitted on a packet basis together with a synchronization signal, the image data is successively transmitted on a packet basis by using the K lane 3K and the TAG lane 3TAG. In this case, for example, the image data may be transmitted with the error check code corresponding to one line added thereto. Concurrently with the above, TAG is combined to calculate an error check code based on CRC on a packet basis, and the error check code is then embedded in Y [7:0] by using the Y lane 3Y. When required, a retransmission flag, a packet number, and a CRC of a retransmitted packet are added.

When an error is detected on the receiving side, retransmitted data assigns unused C [7:0]/M [7:0] to retransmission lanes of K [7:0]/TAG [7:0], and the image data is transmitted through the C lane 3C and the Y lane 3Y that constitute another path different from that used for usual image data transmission. A retransmission flag indicating that data is being retransmitted through the retransmission lanes, a packet number, and a CRC of the retransmitted packet can be added to an error check code notified of through the Y lane 3Y, and can be transmitted at this time.

In addition, a false detection rate can be decreased by using a 7-bit CRC for checking on a pixel basis to embed the CRC in the Y lane by use of a small number of bits, and further by adding a more reliable 16-bit CRC to the end of a line of image data. In this case, a small unit and a large unit are relatively determined, and the size of each unit can be arbitrarily set.

For example, a CRC is calculated on a pixel basis, and a more reliable CRC is added to the end of a line. Subsequently, when the calculation of the CRC at the end of the line is finished, the validity of the line is evaluated. No. 1 shown in table 1 is a case where CRC comparison results agree with each other for both of the pixel unit and the line unit, which indicates that the transmission has been normally completed. CRCs agree with each other for both of the pixel unit and the line unit, and therefore it can be said that normal data transmission could have been achieved.

No. 2 is a case where although no NG has occurred in the CRC based on a pixel unit, a disagreement has occurred in the CRC at the end of the line. In this case, there is a possibility that the CRCs would have accidentally agreed with each other in spite of the occurrence of an ERROR in a certain pixel. In this case, retransmission is performed on a line basis.

No. 3 is a case where CRCs at the ends of the lines agree with each other in spite of the occurrence of NG in a pixel CRC. In this case, it is considered that a false detection has occurred in the CRC based on a pixel unit, and consequently retransmission is performed. The CRC at the end of the line is suspected of the false detection, and whether or not to perform retransmission on a line basis by way of precaution can be switched.

No. 4 is a case where a disagreement has occurred in both of the pixel CRC and the line CRC. When an ERROR occurs somewhere, the result usually becomes No. 4, and therefore it can be determined that the determination has no problem.

If a larger packet size is employed, the restriction of the above-described ERROR timing relationship is relaxed, and there is also a possibility of enabling a retransmission request notification through a command. However, the packet size may be determined in consideration of the ERROR frequency.

In addition, even if retransmission is not performed in the same line, the retransmission may be performed during the transmission of the next line or page so long as the image remains in the buffer. Thus, the timing of the retransmission does not matter. (The retransmission through other lanes does not interfere with the transmission through the K and TAG lanes.)

Moreover, although the ERROR flag is used for the line buffer this time, for example, a method may be used in which separately from Y/M/C/K/TAG, an ERROR bit plane is prepared and stored on a page memory, a part in which an ERROR has occurred in the previous page data is concurrently transmitted together with address information during the transmission of the next page data, and the part is embedded at the corresponding address on the receiving side.

The present system is based on the premise that a system used for a color machine is used for a monochrome machine. However, the system may be configured to be capable of determining whether a machine connected to an engine is a color machine or a monochrome machine at the time of the connection to the engine, and to be capable of switching between circuits (the CMYKT transmission and the transmission proposed this time). Even in the case of the monochrome machine, when the printing speed is sufficient for the retransmission on a line basis, switching off a CRC circuit based on a pixel unit and a buffer of an unused lane enables to contribute to a reduction in power consumption. When errors frequently occur, and consequently when there is a possibility that retransmission on a line basis will exert an influence on the transmission performance, a mode may be switched by turning the circuit on.

TABLE 1

| No. | Pixel CRC | Line CRC | Determination |
|---|---|---|---|
| 1 | OK | OK | OK |
| 2 | OK | NG | NG |
| 3 | NG | OK | NG |
| 4 | NG | NG | NG |

According to an embodiment of the present invention, when a color-image transmission system is used in a monochrome system, performing error retransmission of image data on a small unit basis enables to suppress the decrease in transmission efficiency caused by the retransmission of the image data. In addition, when image data is transmitted on a small unit basis, the image data is transmitted by using a plurality of lanes, which enables to suppress the decrease in transmission efficiency caused by the increase in overhead.

Moreover, performing error retransmission of image data on a small unit basis (pixel, packet) in real time enables to suppress the decrease in transmission efficiency caused by the retransmission.

Furthermore, by suppressing the decrease in transmission efficiency caused by the retransmission at the time of the occurrence of an error, high-speed monochrome machines can be supported by using interfaces similar to those of color machines.

Although the present invention has been described and illustrated in detail, it is clearly understood that the same is by way of illustrated and example only and is not to be taken by way of limitation, the scope of the present invention being interpreted by terms of the appended claims. It is possible to make appropriate changes to the above-described embodiments without departing from the scope of the present invention.

What is claimed is:

1. An image forming system comprising: an image-data transmission unit that transmits image data; and an image-data receiving unit that receives the image data, the image-data transmission unit being connected to the image-data receiving unit through a transmission path having a plurality of lanes used for a color machine,
　　at the time of image data transmission, the image-data transmission unit adding an error check code to image data, and transmitting the image data to the image-data receiving unit, in a first unit of the image data,
　　the image-data receiving unit calculating an error check code in the first unit on the basis of the transmitted image data, comparing the calculated error check code with the error check code transmitted from the image-data transmission unit, and when the calculated error check code does not agree with the error check code transmitted from the image-data transmission unit, transmitting an error to the image-data transmission unit, and
　　when the image-data transmission unit receives the error, the image-data transmission unit retransmitting image data corresponding to the error, wherein the image-data transmission unit is capable of calculating an error check code of image data, and transmitting the calculated error check code to the image-data receiving unit, in a second unit that is smaller than the first unit, the image-data receiving unit compares the error check code calculated on the basis of the transmitted image data with the error check code transmitted from the image-data transmission unit in the second unit, and when the error check code calculated on the basis of the transmitted image data does not agree with the error check code transmitted from the image-data transmission unit, the image-data receiving unit is capable of transmitting an error to the image-data transmission unit, and when the image-data transmission unit transmits monochrome image data, the image-data transmission unit transmits the error check code in the second unit, and transmits the monochrome image data and at least the error check code in the second unit in parallel by using respective different color machine lanes of the transmission path.

2. The image forming system according to claim 1, wherein
the first unit is image data based on an image write line unit, and the second unit is a pixel unit or a packet unit.

3. The image forming system according to claim 1, wherein
the image-data transmission unit is a print controller, and the image-data receiving unit is an image forming device.

4. The image forming system according to claim 1, wherein
the image-data transmission unit comprises a transmission-side image input unit having a buffer that is capable of storing image data for retransmission, a first code addition unit that calculates an error check code of the image data, and adds the error check code to the image data, in the first unit, and a second code addition unit that calculates an error check code of the image data, and adds the error check code to the image data, in the second unit, and
the image-data receiving unit comprises a receiving-side image input unit having a buffer that is capable of storing image data for error check, a first code interpretation unit that calculates an error check code in the first unit, and compares the calculated error check code with the error check code based on the first unit added to the image data, and a second code interpretation unit that calculates an error check code in the second unit, and compares the calculated error check code with the error check code based on the second unit added to the image data.

5. The image forming system according to claim 1, wherein
the image-data transmission unit transmits retransmission data through lanes that differ from lanes for transmitting the image data.

6. The image forming system according to claim 1, wherein
the image-data transmission unit and the image-data receiving unit each calculate and compare error check codes doubly both in the first unit and in the second unit.

7. The image forming system according to claim 6, wherein
the error check code based on the first unit is transmitted through lanes for transmitting image data.

8. The image forming system according to claim 1, wherein
the image-data receiving unit and the image-data transmission unit grasp, by training, a correspondence relationship between an error signal notified from the image-data receiving unit and the timing of a retransmitted pixel.

9. The image forming system according to claim 1, wherein
when the image-data transmission unit transmits retransmission image data in the second unit, the image-data transmission unit transmits the retransmission image data, in parallel with image data and error check codes, through lanes that differ from lanes for transmitting the image data and differ from lanes for transmitting the error check codes.

10. The image forming system according to claim 1, wherein
the image-data transmission unit switches between a monochrome machine system and a color machine system by the same circuit.

11. The image forming system according to claim 1, wherein
the image-data transmission unit is capable of selecting the lanes of the transmission path between a monochrome system and a color system according to a speed of a monochrome machine that receives image data.

12. The image forming system according to claim 1, wherein
the image-data transmission unit selects the lanes of the transmission path between a monochrome system and a color system according to a speed of a monochrome machine that receives image data, and when the speed of the monochrome machine is sufficient, transmission is performed by the monochrome system, and a function of adding the error check code in the second unit, and a function of comparing the error check codes in the second unit by the image-data receiving unit are stopped.

13. The image forming system according to claim 12, wherein
when there is a possibility that the retransmission of the image data does not satisfy performance in the monochrome machine, the image-data transmission unit and the image-data receiving unit enable the functions in the middle, and switch the transmission of the image data and the error check code in the second unit to real-time transmission to perform the transmission.

14. The image forming system according to claim 1, wherein
when the image-data transmission unit not only transmits image data in the same unit but also transmits the image data in a different unit, the image-data transmission unit is capable of retransmitting the image data and the error check code for retransmission.

15. An image-data transmission unit that is connected to an image-data receiving unit through a transmission path having an a plurality of lanes for a color machine, adds an error check code to image data, and transmits the image data to the image-data receiving unit, in a first unit, and
when an error is received from the image-data receiving unit, retransmits image data corresponding to the error to the image-data receiving unit, wherein
the image-data transmission unit is further capable of calculating an error check code, and transmitting the calculated error check code to the image-data receiving unit, in a second unit that is smaller than the first unit, and when an error is received from the receiving side, retransmitting image data corresponding to the error, and when the image-data transmission unit transmits a monochrome image, the image-data transmission unit transmits an error check code in the second unit, and transmits the monochrome image data and at least the error check code in the second unit in parallel by using respective different color machine lanes of the transmission path.

16. An image-data transmission method in which an error check code is added to image data, and the image data is transmitted through a transmission path having a plurality of lanes used for a color machine, in a first unit, and when an error is received from a receiving side, image data corresponding to the error is retransmitted, the method comprising the steps of:

calculating an error check code, and transmitting the calculated error check code to the receiving side, in a second unit that is smaller than the first unit, and when an error is received from the receiving side, retransmitting image data corresponding to the error; and when monochrome image data is transmitted, transmitting the error check code in the second unit, and transmitting the monochrome image data and at least the error check code in the second unit in parallel by using respective different color machine lanes of the transmission path.

17. An image-data transmission method in which an error check code is added to image data, and the image data is transmitted through a transmission path having a plurality of lanes used for a color machine, in a first unit, then on a receiving side, an error check code is calculated on the basis of the transmitted image data, the calculated error check code is compared with the transmitted error check code, and when the error check codes do not agree with each other, an error is transmitted to a transmission side, and on the transmission side, when the error is received, image data corresponding to the error is retransmitted, the method comprising the steps of:

calculating an error check code in a second unit that is smaller than the first unit, and transmitting the calculated error check code to the receiving side;

on the receiving side, comparing the error check code calculated on the basis of the transmitted image data with the transmitted error check code in a second unit, and when the error check codes do not agree with each other, transmitting an error to the transmission side; and when monochrome image data is transmitted, transmitting the error check code in the second unit, and transmitting the monochrome image data and at least the error check code in the second unit in parallel by using respective different color machine lanes of the transmission path.

* * * * *